(12) United States Patent
Ishiwa

(10) Patent No.: US 7,050,127 B2
(45) Date of Patent: May 23, 2006

(54) LIQUID CRYSTAL DISPLAY DEVICE COMPRISING A UNIT COVER WITH BONDED FLEXIBLE CABLE

(75) Inventor: Masaru Ishiwa, Kawasaki (JP)

(73) Assignee: Sharp Kabushiki Kaisha, Osaka (JP)

(*) Notice: Subject to any disclaimer, the term of this patent is extended or adjusted under 35 U.S.C. 154(b) by 40 days.

(21) Appl. No.: 10/612,787

(22) Filed: Jul. 2, 2003

(65) Prior Publication Data
US 2004/0012731 A1   Jan. 22, 2004

(30) Foreign Application Priority Data
Jul. 8, 2002   (JP)   .............................. 2002-199111

(51) Int. Cl.
*G02F 1/1333*   (2006.01)

(52) U.S. Cl. ........................................ 349/58; 349/150

(58) Field of Classification Search .................. 349/58, 349/60, 150, 63, 5, 65
See application file for complete search history.

(56) References Cited

U.S. PATENT DOCUMENTS 5,835,179 A * 11/1998 Yamanaka ................... 349/161
6,847,416 B1 * 1/2005 Lee et al. ...................... 349/58

FOREIGN PATENT DOCUMENTS

JP   10-48599   2/1998
JP   11-109319   4/1999

* cited by examiner

*Primary Examiner*—Andrew Schechter
*Assistant Examiner*—Thoi V. Duong
(74) *Attorney, Agent, or Firm*—Greer, Burns, & Crain, LTD

(57) ABSTRACT

A liquid crystal display device includes a liquid crystal panel, a flexible cable, an illuminating device and a unit cover, which accommodates the liquid crystal panel and the illuminating device. The unit cover is formed by a lower cover and an upper cover coupled to each other, the lower cover and the upper cover each having a lower or upper wall, a side wall, and a wall part bent from the side wall. The flexible cable extends between the wall part of the lower cover and the wall part of the upper cover from the inside to the outside of the unit cover. The flexible cable is interposed between, and held by, the wall part of the lower cover and the wall part of the upper cover.

4 Claims, 5 Drawing Sheets

LIQUID CRYSTAL DISPLAY DEVICE COMPRISING A UNIT COVER WITH BONDED FLEXIBLE CABLE

BACKGROUND OF THE INVENTION

1. Field of the Invention

The present invention relates to a liquid crystal display device in which a liquid crystal panel is accommodated in a unit cover.

2. Description of the Related Art

There is a liquid crystal display device in which a liquid crystal panel is accommodated in a unit cover. For example, in a liquid crystal display device 1 shown in FIG. 9, a liquid crystal panel 2 including liquid crystal arranged between a pair of substrates, and an illuminating means 3, are accommodated in a unit cover 4. The unit cover 4 comprises a lower cover 4L and an upper cover 4U. One end of a flexible cable 5 is bonded to one of the substrates 2a. The flexible cable 5 extends between the end of the lower cover 4L and the end of the upper cover 4U from the inside to the outside of the unit cover 4. The flexible cable 5 is bent along the rounded end of the lower cover 4L and extends to the outside of the unit cover.

The flexible cable 5 is frequently used in the bent condition as shown in FIG. 9. When the flexible cable 5 is used in the bent condition, a rotation moment 6 is produced about the bent part of the flexible cable 5 and a force that tends to peel the end of the flexible cable 5 off the substrate 2a is produced. However, in the conventional unit cover 4, no measure is taken against such a force. Also, when an attempt is made to reduce the bonding width W of the flexible cable 5 to the substrate 2a in order to reduce the size of the liquid crystal panel 2 (size of the substrate 2a), the bonding strength is deteriorated and the flexible cable 5 is apt to peel off, so it is not possible to reduce the size of the liquid crystal panel 2 (size of the substrate 2a). Moreover, when the liquid crystal panel 2 is bonded to the lower cover 4L of the unit cover 4, it is necessary to peel the liquid crystal panel 2 off the lower cover 4L to repair the liquid crystal panel 2, but it is impossible to insert a tool between the substrate 2a and the lower cover 4L because the four sides of the lower cover 4L are bent.

SUMMARY OF THE INVENTION

It is an object of the present invention to provide a liquid crystal display device capable of preventing the flexible cable from being peeled off by an external force and capable of reducing the size of a liquid crystal panel (size of a substrate).

A liquid crystal display device, according to the present invention, comprises a liquid crystal panel having a pair of substrates and a liquid crystal interposed therebetween, a flexible cable connected to one of the substrates, an illuminating device to illuminate the liquid crystal panel, and a unit cover accommodating the liquid crystal panel and the illuminating device, wherein the unit cover comprises a lower cover and an upper cover coupled to each other, the lower cover having a lower wall supporting the substrate, a side wall provided on one side of the lower wall, and a wall part bent from the side wall, the upper cover having an upper wall, a side wall provided on one side of the upper wall, and a wall part bent from the side wall and opposed to the wall part of the lower cover, and wherein the flexible cable extends between the wall part of the lower cover and the wall part of the upper cover from the inside to the outside of the unit cover, and is interposed between, and held by, the wall part of the lower cover and the wall part of the upper cover.

In this structure, a force that tends to peel the flexible cable off the substrate is not produced because the flexible cable is interposed between, and held by, the wall part of the lower cover and the wall part of the upper cover extending in parallel to the substrate on which the flexible cable is provided.

In a further aspect of the present invention, a liquid crystal display device comprises a liquid crystal panel having a pair of substrates and a liquid crystal interposed therebetween, a flexible cable connected to one of the substrates, an illuminating device to illuminate the liquid crystal panel, a unit cover accommodating the liquid crystal panel and the illuminating device, and supporting means arranged in the unit cover to support the flexible cable, wherein the unit cover comprises a lower cover and an upper cover coupled to each other, the lower cover having a lower wall supporting one substrate and a side wall provided on one side of the lower wall, the upper cover having an upper wall and a side wall provided on one side of the upper wall, and wherein the flexible cable extends between the side wall of the lower cover and the side wall of the upper cover from the inside to the outside of the unit cover, and is interposed between and held by the supporting means.

In this structure, a force that tends to peel off the flexible cable from the substrate is not produced because the flexible cable is located within the unit cover and supported by the supporting means in such a way that the flexible cable takes a position in parallel to the substrate. As a result, it is possible to reduce the bonding width of the flexible cable to the substrate and to reduce the size of the liquid crystal panel (size of the substrate).

BRIEF DESCRIPTION OF THE DRAWINGS

The present invention will become more apparent from the following description of the preferred embodiments, with reference to the accompanying drawings, in which.

DESCRIPTION OF THE PREFERRED EMBODIMENTS

Preferred embodiments of the present invention will be explained below with reference to the drawings.

Figure 1:
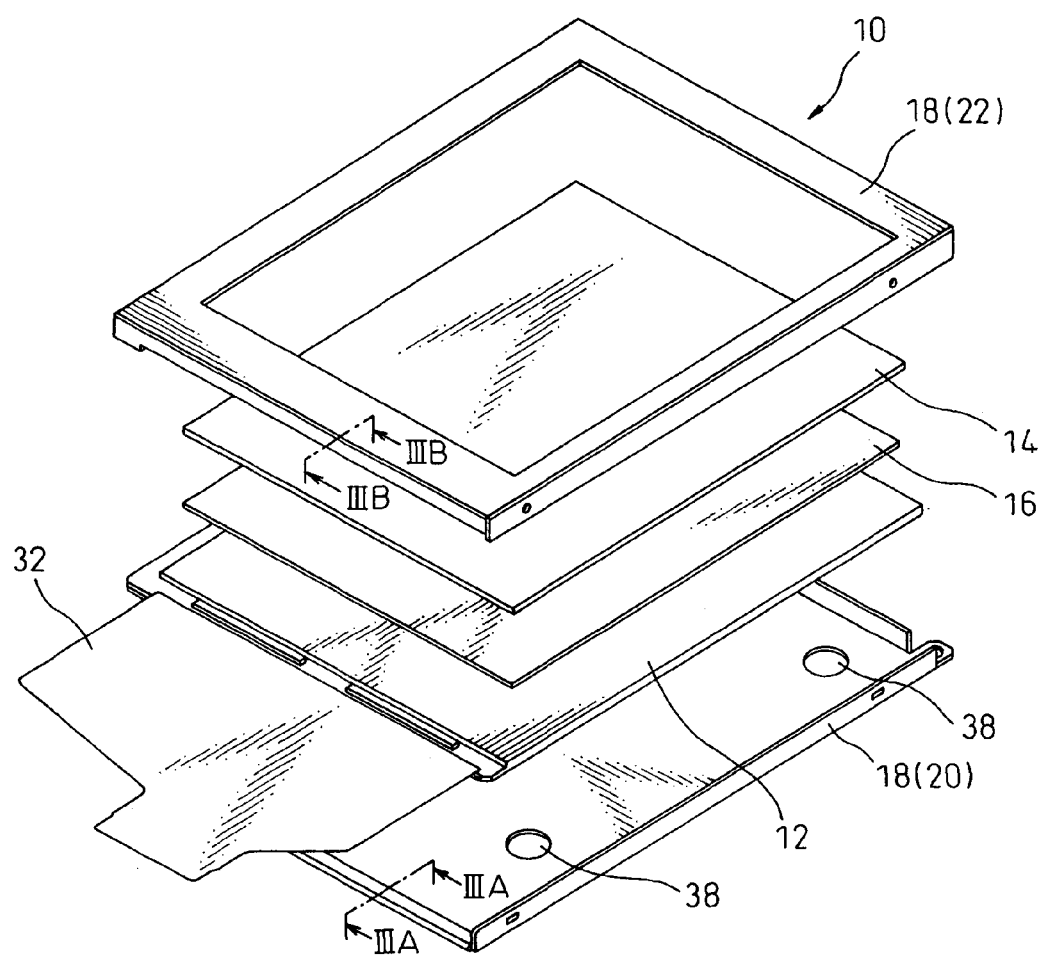
FIG. 1 is an exploded perspective view of a liquid crystal display device in one embodiment of the present invention.
Figure 2:
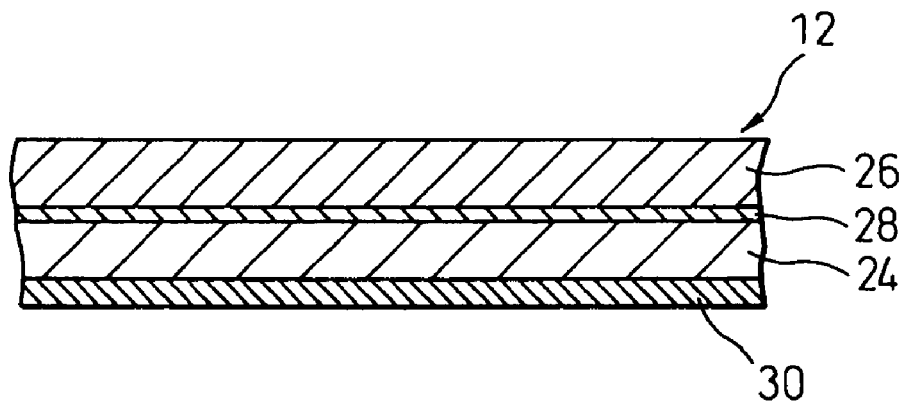
FIG. 2 is a schematic sectional view of the liquid crystal panel in FIG. 1.
Figure 3:
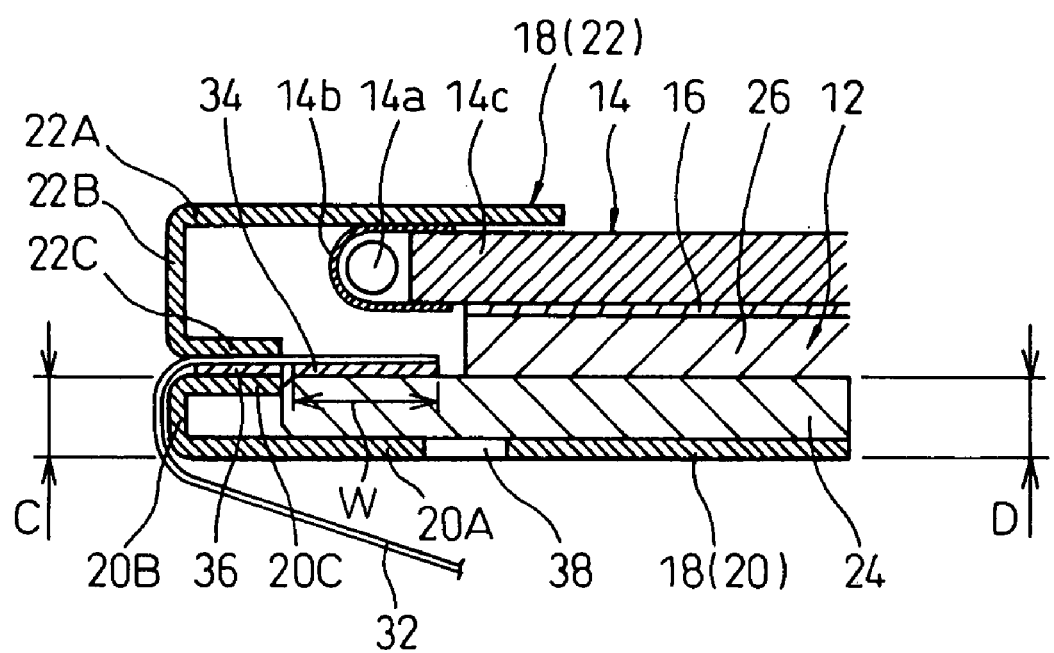
FIG. 3 is a partial sectional view of the liquid crystal display device of FIG. 1, taken along the lines IIIA—IIIA and IIIB—IIIB in FIG. 1.

FIG. 1 is an exploded perspective view of the liquid crystal display device in one embodiments of the present invention. FIG. 2 is a schematic sectional view of the liquid crystal panel in FIG. 1. FIG. 3 is a partial sectional view of the liquid crystal display device of FIG. 1, taken along the lines IIIA—IIIA and IIIB—IIIB in FIG. 1.

The liquid crystal display device 10 comprises a liquid crystal panel 12, an illuminating device 14, a polarizer 16 and a unit cover 18 accommodating the liquid crystal panel 12 and the illuminating device 14. The unit cover 18 comprises a lower cover 20 and an upper cover 22. The lower cover 20 and the upper cover 22 have side walls extending toward each other and the lower cover 20 and the upper cover 22 are fixed to each other by fitting one side wall into another. The lower cover 20 and the upper cover 22 are fitted in each other at three sides of the unit cover 18 and a flexible cable 32 extends from the inside to the outside of the unit cover 18 at the remaining one side.

The liquid crystal panel 12 comprises a pixel electrode substrate 24 having pixel electrodes arranged thereon, an opposed electrode substrate 26 arranged so as to be opposed to the pixel electrode substrate 24 and having a common electrode formed thereon, a liquid crystal 28 inserted between the substrates 24 and 26, and a reflecting layer 30 (FIG. 2). The polarizer 16 is arranged between the illuminating device 14 and the liquid crystal panel 12.

The illuminating device 14 comprises a lamp 14a, a reflector 14b and a light guide plate 14c (FIG. 3). Small prisms are formed on the surface of the light guide plate 14c and light that enters the light guide plate 14c from the lamp 14a through the side of the light guide plate 14c is reflected by the prisms on the surface of the light guide plate 14c and is directed toward the liquid crystal panel 12. The light passing through the liquid crystal panel 12 is reflected by the reflecting layer 30 and passes through the liquid crystal panel 12 again and proceeds toward the display part of the upper cover 22. The liquid crystal display device 10 is used, for example, in a cellular phone, a PDA, and the like.

The flexible cable 32 is connected to the pixel electrode substrate 24. One end of the flexible cable 32 is thermally pressure-bonded to the pixel electrode substrate 24 using an anisotropic conductive resin 34 (bonding width W). The flexible cable 32 extends from the inside to the outside of the unit cover 18 and the other end of the flexible cable 32 is connected to an electric circuit, which is not shown here.

As shown in FIG. 3, the lower cover 20 of the unit cover 18 comprises a lower wall 20A supporting the pixel electrode substrate 24, a side wall 20B provided on one side of the lower wall 20A, and a wall part 20C bent from the side wall 20B. The end region of the lower wall 20A, the side wall 20B and the wall part 20C form a laid down U-shape. The wall part 20C extends in parallel to the pixel electrode substrate 24.

The distance C between the top surface of the wall part 20C and the bottom surface of the lower wall 20A of the lower cover 22 is almost equal to the distance D between the top surface of the pixel electrode substrate 24 and the bottom surface of the lower wall 20A.

The upper cover 22 comprises an upper wall 22A, a side wall 22B provided on one side of the upper wall 22A, and a wall part 22C bent from the side wall 22B and opposed to the wall part 20C of the lower cover 20. The wall part 20C of the lower cover 20 and the wall part 22C of the upper cover 22 extend in parallel to the pixel electrode substrate 24.

The flexible cable 32 extends between the wall part 20C of the lower cover 20 and the wall part 22C of the upper cover 22 from the inside to the outside of the unit cover 18, and is interposed between and held by the wall part 20C of the lower cover 20 and the wall part 22C of the upper cover 22. Therefore, the flexible cable 32 is maintained in a substantially horizontal position between the part at which it is bonded to the pixel electrode substrate 24 and the part interposed between the wall part 20C and the wall part 22C. The flexible cable 32 can be bent freely at the outside of the unit cover 18.

Figure 4:
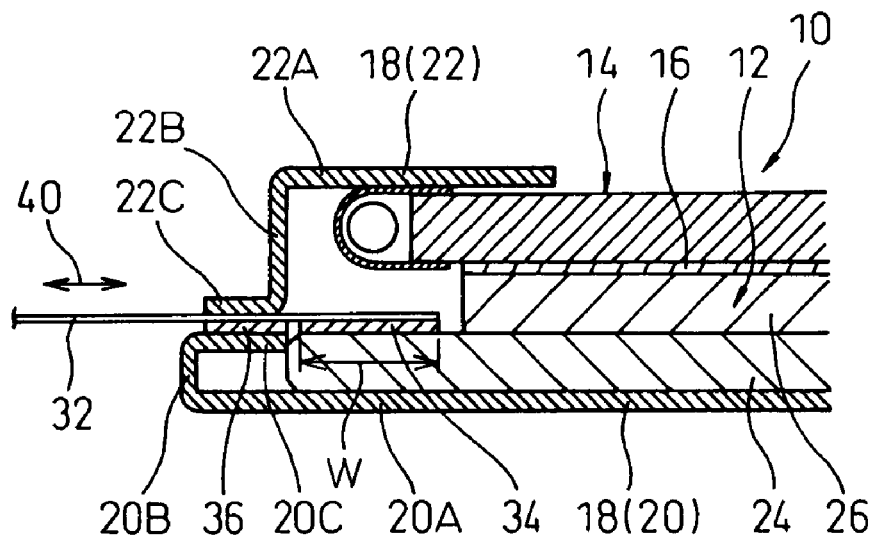
FIG. 4 is a sectional view of a modification of the liquid crystal display device shown in FIG. 3.

No force is exerted on the bonded part of the flexible cable 32 at which the flexible cable 32 is bonded to the pixel electrode substrate 24, even if the flexible cable 32 is bent at the outside of the unit cover 18 or it is pulled or pushed in the direction of the arrow 40 of FIG. 4, because the flexible cable 32 is interposed between and held by the wall part 20C and the wall part 22G. Therefore, the flexible cable 32 can be prevented from being peeled off the pixel electrode substrate 24. It is desirable that the flexible cable 32 be bonded to the wall part 20C of the lower cover 20 with an adhesive 36 with the bonding width W in order that the flexible cable 32 is retained securely by the wall part 20C of the lower cover 20. As a result, it is possible to reduce the bonding width W of the flexible cable 32 to the substrate 24 and to reduce the size of the liquid crystal panel (size of the substrate 24).

The pixel electrode substrate 24 is arranged so as to come into contact with the wall part 20C of the lower cover 20. This facilitates determining the position of the liquid crystal panel 12 and reduces the number of man-hours required in assembling. The lower wall 20A of the lower cover 20 has one hole or a plurality of holes 38. The pixel electrode substrate 24 of the liquid crystal panel 12 is bonded to the lower wall 20A of the lower cover 20 with an adhesive or a double-sided adhesive tape, and when the liquid crystal panel 12 is peeled off the lower cover for repair, it is easy to push up the liquid crystal panel 12 by inserting a tool into the hole(s) 38.

Figure 5:
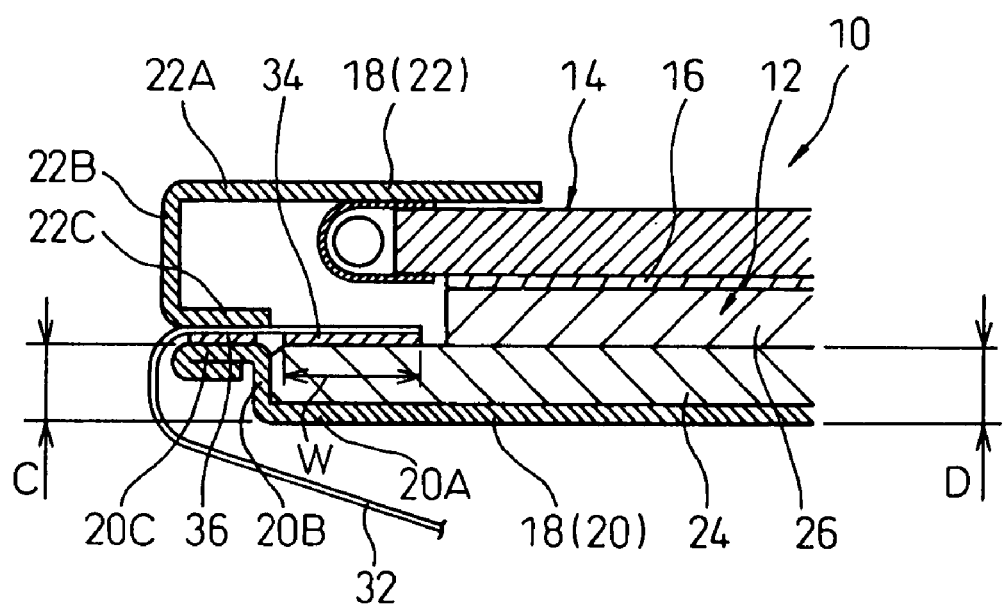
FIG. 5 is a sectional view of a modification of the liquid crystal display device shown in FIG. 3.
Figure 6:
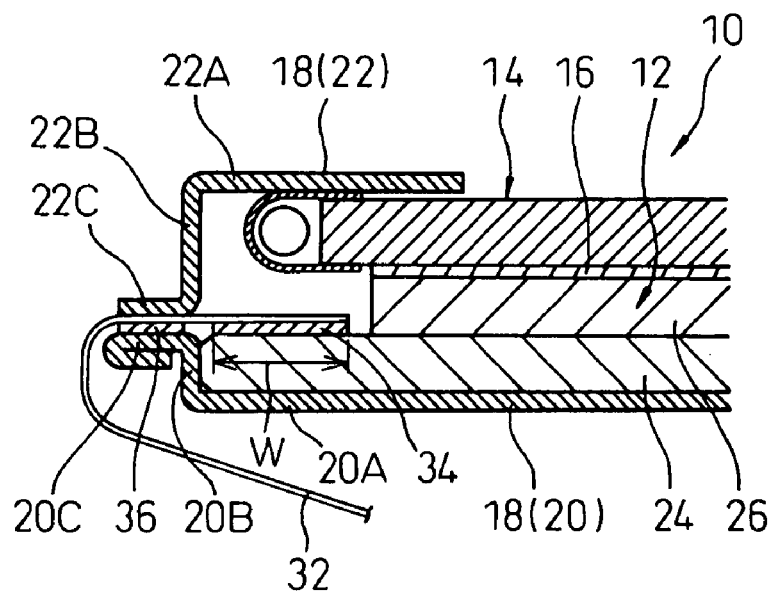
FIG. 6 is a sectional view of a modification of the liquid crystal display device shown in FIG. 3.

FIGS. 4 to 6 are sectional views of modifications of the liquid crystal display device shown in FIG. 3. In FIG. 4, the wall part 20C of the lower cover 20 is bent inward from the side wall 20B, but the wall part 22C of the upper cover 22 is bent outward. However, the wall part 20C of the lower cover 20 and the wall part 22C of the upper cover 22 are opposed to each other and the flexible cable 32 is interposed between and held by the wall part 20C of the lower cover 20 and the wall part 22C of the upper cover 22. Even if a force in the direction of the arrow 40 is exerted on the flexible cable 32 at the outside of the unit cover 18, the flexible cable 32 can be prevented from being shifted from the pixel electrode substrate 24 at the bonded part within the unit cover 18.

In FIG. 5, the wall part 20C of the lower cover 20 is bent outward from the side wall 20B and the top thereof is further bent, and the wall part 22C of the upper cover 22 is bent inward from the side wall 22B. However, the wall part 20C of the lower cover 20 and the wall part 22C of the upper cover 22 are opposed to each other and the flexible cable 32 is interposed between and held by the wall part 20C of the lower cover 20 and the wall part 22C of the upper cover 22.

In FIG. 6, the wall part 20C of the lower cover 20 is bent outward from the side wall 20B and the top thereof is further bent, and the wall part 22C of the upper cover 22 is bent outward from the side wall 22B. However, the wall part 20C of the lower cover 20 and the wall part 22C of the upper cover 22 are opposed to each other and the flexible cable 32 is interposed between and held by the wall part 20C of the lower cover 20 and the wall part 22C of the upper cover 22.

Figure 7:
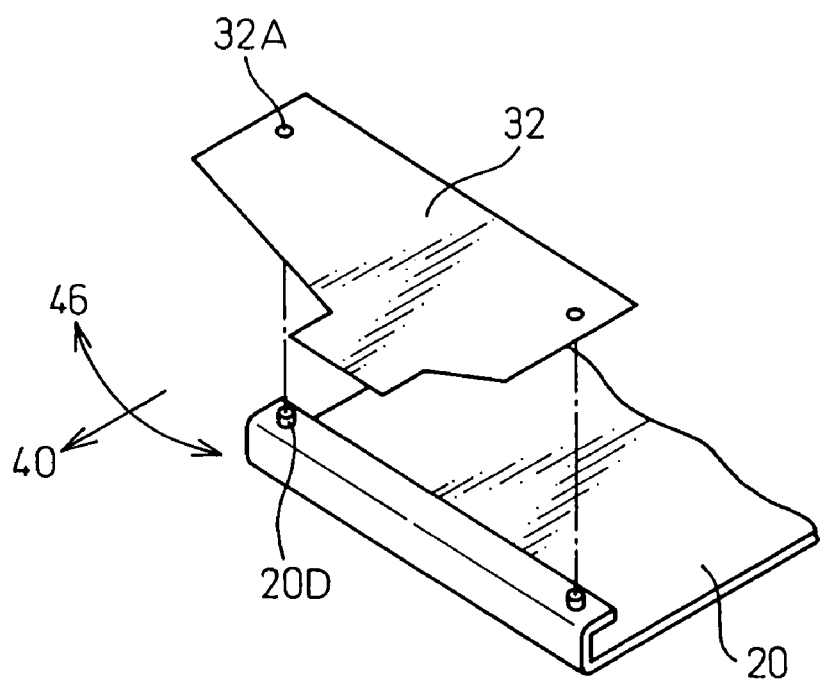
FIG. 7 is a perspective view of a part of a modification of the liquid crystal display device shown in FIG. 3.

FIG. 7 is a perspective view of a part of a modification of the liquid crystal display device shown in FIG. 3. FIG. 7 shows the flexible cable 32 and the lower cover 20. A plurality of projections 20D are provided on the lower cover 20 and a plurality of holes 32A adapted for engagement with the projections 20D are provided in the flexible cable 32.

In this embodiment, the holes 32A of the flexible cable 32 engage with the projections 20D of the lower cover 20 and the flexible cable 32 is interposed between and held by the lower cover 20 and the upper cover 24 (not shown in FIG. 7), and accordingly, it is possible to prevent the flexible cable 32 from being peeled off with respect to the pulling force in the direction of the arrow 40 as well as the horizontal rotational force in the direction of the arrow 46.

Figure 8:
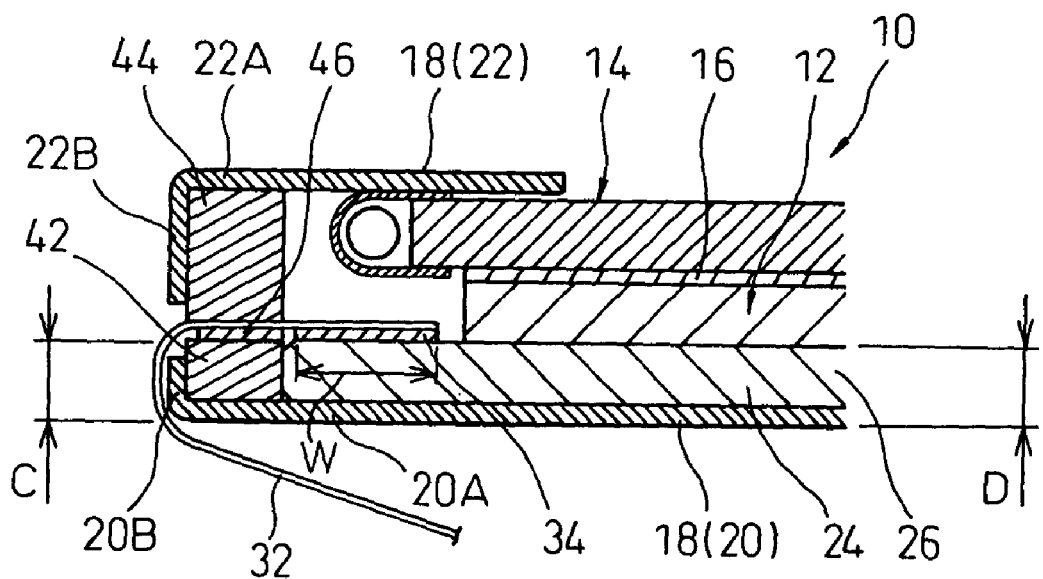
FIG. 8 is a sectional view of a liquid crystal display device in another embodiment of the present invention.
Figure 9:
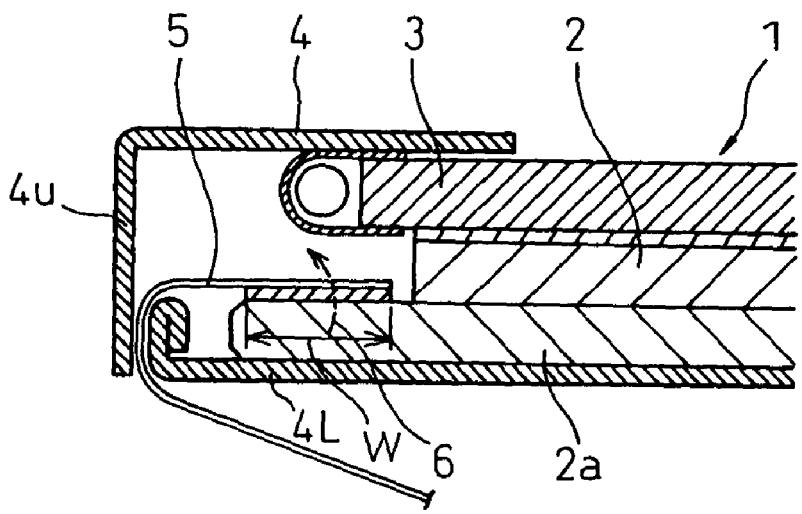
FIG. 9 is a sectional view of a conventional liquid crystal display device.

FIG. 8 shows the cross section of the liquid crystal display device in the second embodiment of the present invention. Similar to the embodiment described above, the liquid crystal display device 10 in the present embodiment comprises a liquid crystal panel 12, an illuminating device 14, and a unit cover 18 accommodating the liquid crystal panel 12 and the illuminating device 14. The unit cover comprises a lower cover 20 and an upper cover 22. The lower cover 20 and the upper cover 22 have side walls extending toward each other, and the lower cover 20 and the upper cover 22 are fixed to each other by fitting one side wall into another. The lower cover 20 and the upper cover 22 are fitted into each other at three sides of the unit cover 18 and the flexible cable 32 extends from the inside to the outside of the unit cover 18 at the remaining one side. One end of the flexible cable 32 is thermally press-bonded to the pixel electrode substrate 24 with the anisotropic conductive resin 34.

The lower cover 20 of the unit cover 18 has a lower wall 20A supporting the pixel electrode substrate 24 and a side wall 20B provided at one side of the lower wall 20A. The upper cover 22 has an upper wall 22A and a side wall 22B provided at one side of the upper wall 22A. The flexible cable 32 extends between the side wall 20B of the lower cover 20 and the side wall 22B of the upper cover 22 from the inside to the outside of the unit cover 18.

In this embodiment, flexible spacers (supporting members) 42 and 44 are arranged in the unit cover 18. The flexible spacer 42 is retained in the lower cover 20 and the flexible spacer 44 is retained in the upper cover 22. The flexible cable 32 extends between the flexible spacers 42 and 44 and is supported in a position parallel to the pixel electrode substrate 24 by the flexible spacers 42 and 44. The flexible cable 32 is bonded to the flexible spacer 42 by the adhesive 36, resulting in the flexible cable 32 being securely retained by the wall part 20C of the lower cover 20.

In this embodiment too, even if a force is exerted on the flexible cable 32, it is not exerted on the part where the flexible cable 32 is bonded to the pixel electrode substrate 24. It is desirable that the flexible cable 32 is bonded to the flexible spacer 42 by an adhesive 40. Therefore, the flexible cable 32 is prevented from being peeled off the pixel electrode substrate 24.

In accordance with the present invention, as described above, the flexible cable can be prevented from being peeled off by an external force. Also, it is possible to provide a liquid crystal display device in which the size of the liquid crystal panel (size of the substrate) can be reduced.

The invention claimed is:

1. A liquid crystal display device comprising:
   a liquid crystal panel having a pair of substrates and a liquid crystal interposed therebetween;
   a flexible cable connected to one of the substrates;
   an illuminating device to illuminate said liquid crystal panel; and
   a unit cover accommodating said liquid crystal panel and said illuminating device;
   wherein said unit cover comprises a lower cover and an upper cover coupled to each other, said lower cover having a lower wall supporting said one of the substrates, a side wall provided on one side of said lower wall, and a wall part bent from said side wall, the upper cover having an upper wall, a side wall provided on one side of said upper wall, and a wall part bent from said side wall and opposed to the wall part of said lower cover, and wherein said flexible cable extends between said wall part of the lower cover and said wall part of the upper cover from the inside to the outside of said unit cover, said flexible cable extending substantially parallel to said one of the substrates where said flexible cable is bonded to said one of the substrates and between the wall part of the lower cover and said wall part of the upper cover, and is interposed between, and held by, said wall part of the lower cover and said wall part of the upper cover.

2. The liquid crystal display device as set forth in claim 1, wherein said flexible cable is bonded to said wall part of the lower cover.

3. A liquid crystal display device as set forth in claim 1, wherein said one of the substrates comes into contact with said wall part of the lower cover.

4. The liquid crystal display device as set forth in claim 1, wherein at least one hole is provided in the lower wall in order to peel the liquid crystal panel off the lower cover.

\* \* \* \* \*